J. MRAZEK.
CONTAINER.
APPLICATION FILED SEPT. 16, 1920.
1,383,838.
Patented July 5, 1921.
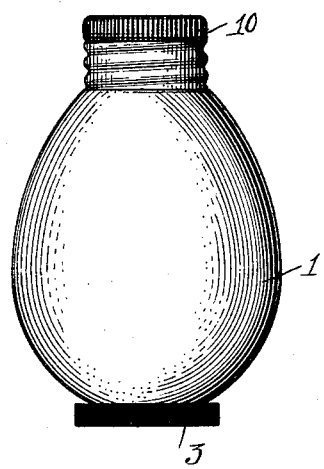
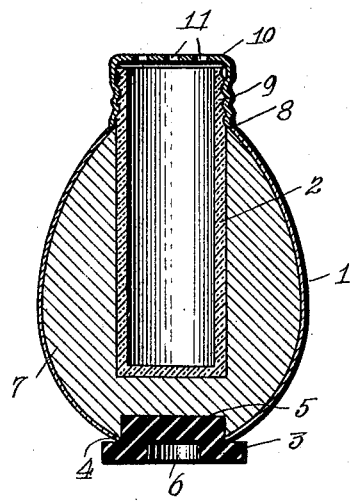
WITNESSES
INVENTOR
JOSEPH MRAZEK
BY
ATTORNEYS

UNITED STATES PATENT OFFICE.

JOSEPH MRAZEK, OF NEW YORK, N. Y.

CONTAINER.

1,383,838.  Specification of Letters Patent.  Patented July 5, 1921.

Application filed September 16, 1920. Serial No. 410,774.

*To all whom it may concern:*

Be it known that I, JOSEPH MRAZEK, a citizen of the United States, and a resident of the city of New York, borough of Manhattan, in the county of New York and State of New York, have invented a new and Improved Container, of which the following is a full, clear, and exact description.

This invention relates to improvements in containers, and more particularly to condiment holders, perfume containers, and similar small receptacles which are ornamentally made, an object of the invention being to utilize an egg shell as the exterior of the container, said egg shell readily lending itself to painting, decorating, and ornamentation of various sorts.

A further object is to provide a container which can be manufactured and sold at an extremely low price, yet which will be ornamental and attractive in appearance, and strong and durable in use.

With these and other objects in view the invention consists in certain novel features of construction, and combinations and arrangements of parts as will be more fully hereinafter described and pointed out in the claims.

In the accompanying drawings—

Figure 1 is a view in side elevation illustrating my improved container.

Fig. 2 is a view in vertical longitudinal section through the center of Fig. 1.

My improved container comprises an outer casing 1 which comprises an ordinary egg shell, an inner receptacle 2 which may be of glass, porcelain, or any other suitable material, and a base 3 which is preferably of rubber or other cushioning material.

In constructing my improved container I utilize an ordinary egg shell having alined openings in its respective ends and I position in the lower opening 4 the upwardly projecting portion 5 of the base 3. This base 3 is laterally extended and may be recessed centrally in its lower portion, as shown at 6, but may, of course, be made of any other shape desired.

Within the shell or casing 1, I position wax or other similar plastic material in liquid, semi-liquid, or plastic condition, the wax being indicated by the reference numeral 7.

It is to be understood that the wax or other plastic material 7 will but partially fill the casing or shell 1 so that when the receptacle 2 is forced into the casing or shell through the upper opening 8, it will displace the wax or other plastic material and force the same upwardly so as to fill or substantially fill the space between the casing or shell 1 and the receptacle 2. This plastic material 7 will also bind around the upwardly projecting portion 5 of the base 3 and operate to couple the parts together when the plastic material sets.

The particular receptacle 2 illustrated is provided with a screw threaded upper end 9 for the reception of a cap 10, the latter being perforated as shown at 11, so that the container may be utilized as a condiment holder.

It is, of course, obvious that the particular form of cover may be varied to suit the use to which the container is to be put, and while my invention is particularly adapted for use as a condiment holder, it is also adapted for use as a container for perfume and the like and in fact, may be used for any purpose desired, and I do not wish to limit myself to the precise details set forth, but consider myself at liberty to make such changes and alterations as fairly fall within the spirit and scope of the appended claims.

I claim:

1. As a new article of manufacture, a container comprising an egg shell casing, and a receptacle located therein.

2. As a new article of manufacture, a container comprising an egg shell casing, a receptacle in the casing, and plastic material between the receptacle and the egg shell casing.

3. A container, comprising an egg shell casing having openings in its ends, a base projected into the lower opening of the egg shell casing, a receptacle projecting through the upper opening in the egg shell casing, and plastic material located around the receptacle and the upwardly projecting portion of the base and substantially filling the egg shell casing.

4. A container, comprising an egg shell casing, a cushioned base secured to the lower end of the casing, a receptacle projected through the upper end of the casing, plastic material between the receptacle and the casing, and a closure removably connected to the upper end of the receptacle.

5. As a new article of manufacture, a container comprising an egg shell casing having an open upper end, a base secured to the lower end of the casing, and a receptacle secured in the casing and having its upper end projecting through the open upper end of the casing.

JOSEPH MRAZEK.